United States Patent
Charbon

(10) Patent No.: US 8,950,552 B2
(45) Date of Patent: Feb. 10, 2015

(54) MAINSPRING COMPRISING SUPPLEMENTARY ENERGY ACCUMULATION CURVES

(75) Inventor: Christian Charbon, Chezard-St-Martin (CH)

(73) Assignee: Nivarox-FAR S.A., Le Locle (CH)

( * ) Notice: Subject to any disclaimer, the term of this patent is extended or adjusted under 35 U.S.C. 154(b) by 0 days.

(21) Appl. No.: 14/111,089

(22) PCT Filed: Apr. 3, 2012

(86) PCT No.: PCT/EP2012/056067
§ 371 (c)(1),
(2), (4) Date: Oct. 10, 2013

(87) PCT Pub. No.: WO2012/150101
PCT Pub. Date: Nov. 8, 2012

(65) Prior Publication Data
US 2014/0027205 A1    Jan. 30, 2014

(30) Foreign Application Priority Data
May 3, 2011    (EP) .................................... 11164618

(51) Int. Cl.
G04B 1/10    (2006.01)
F03G 1/00    (2006.01)
F03G 1/02    (2006.01)
G04B 1/14    (2006.01)

(52) U.S. Cl.
CPC . *F03G 1/02* (2013.01); *G04B 1/145* (2013.01)
USPC .......................... 185/40 A; 185/40 K; 368/140

(58) Field of Classification Search
CPC ......... F03G 1/00; F03G 2730/01; G04B 1/10; G04C 1/024
USPC ................ 185/40 A, 40 K, 45; 368/140, 144; 267/154–157, 182
See application file for complete search history.

(56) References Cited

U.S. PATENT DOCUMENTS 4,149,707 A    4/1979 Aronson
5,539,708 A *  7/1996 Guignard ...................... 368/140

FOREIGN PATENT DOCUMENTS

| CH | 181 861 | 1/1936 |
| DE | 802 363 | 2/1951 |
| DE | 23 29 725 | 1/1975 |
| FR | 2 373 722 | 7/1978 |
| GB | 895 666 | 5/1962 |

OTHER PUBLICATIONS

International Search Report Issued Aug. 27, 2012 in PCT/EP12/056067 Filed Apr. 3, 2012.

* cited by examiner

*Primary Examiner* — Phillip A Johnson
(74) *Attorney, Agent, or Firm* — Oblon, Spivak, McClelland, Maier & Neustadt, L.L.P.

(57) ABSTRACT

A barrel including a box for receiving a pivot arbour and at least one spring, wherein the at least one spiral spring is mounted between an internal wall of the box and an external wall of the pivot arbour , and can be wound to supply mechanical energy. The barrel further includes a device for increasing torque of the at least one spring including supplementary energy accumulation curves made on the spring so that the barrel torque is customized according to a winding tension of the at least one spring. The barrel can be a timepiece barrel.

8 Claims, 1 Drawing Sheet

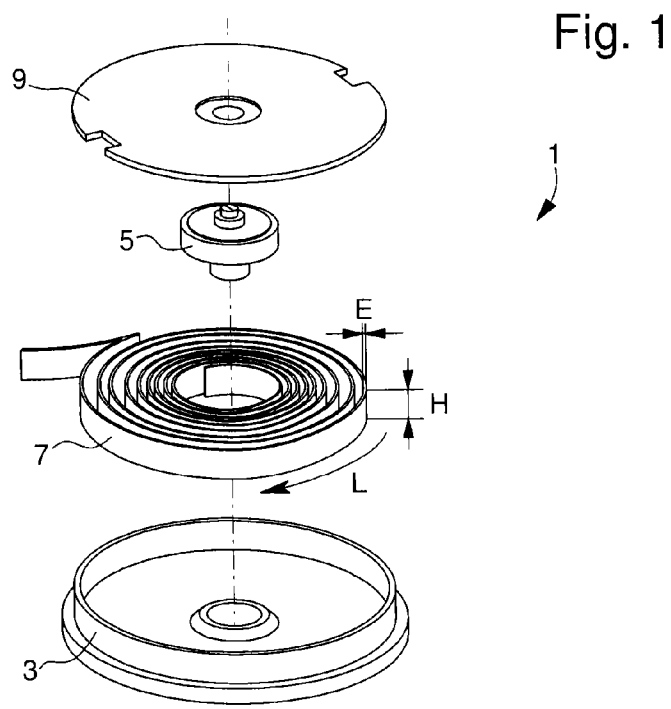
Fig. 1
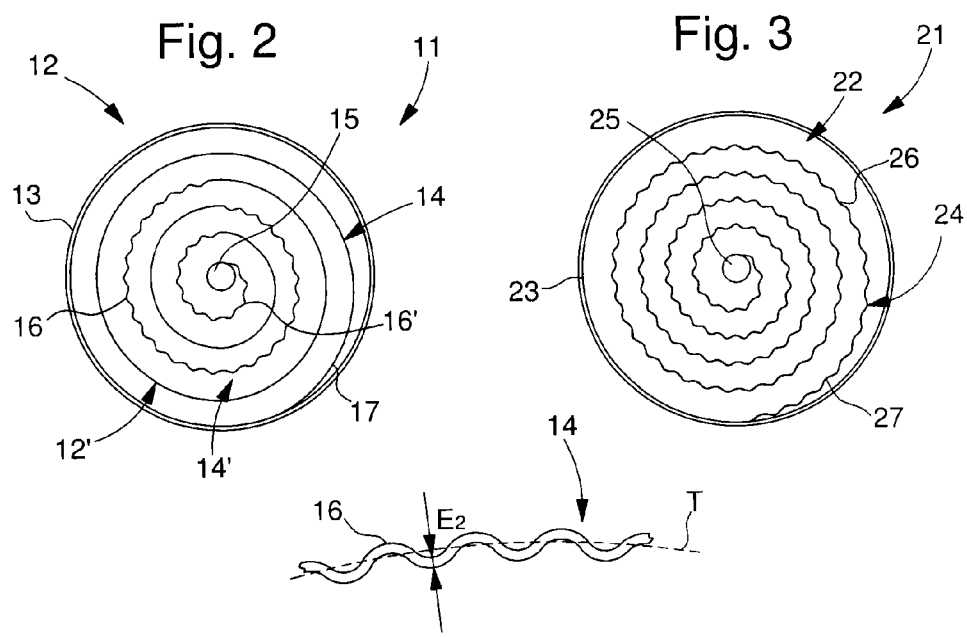
Fig. 2
Fig. 3
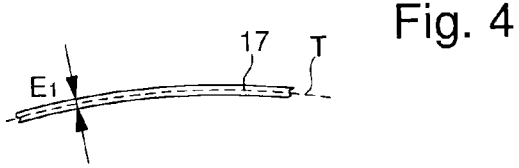
Fig. 4

MAINSPRING COMPRISING SUPPLEMENTARY ENERGY ACCUMULATION CURVES

CROSS-REFERENCE TO RELATED APPLICATIONS

This a National Phase Application in the United States Of International Patent Application PCT/EP2012056067 filed on Apr. 3, 2012 which claims priority on European Patent Application No. 11164618.8 filed on May 3, 2011. The entire disclosures of the above patent applications are hereby incorporated by reference.

FIELD OF THE INVENTION

The invention relates to a barrel including a device for increasing torque and, more specifically, a barrel of this type whose spring comprises supplementary energy accumulation curves.

BACKGROUND OF THE INVENTION

Current barrels 1, as illustrated in FIG. 1, are generally formed by a box 3 called a "drum" intended to receive a pivot arbour 5 and a spring 7. Spiral spring 7 has a length L, a height H and thickness E. Spring 7 is mounted between the internal wall of box 3 and the external wall of pivot arbour 5. Box 3 is generally closed by a cover 9. Spring 7 can thus be wound to supply mechanical energy to the movement of the timepiece in which it is integrated.

The problem raised by this configuration of current springs is that a constant torque is not provided throughout the letting down of said springs, which causes a variation in the amplitude of the balance detrimental to the precision of the timepiece movement.

Moreover, it is difficult to reconcile the shape of current substantially S-shaped springs at rest and the space required thereby with positive fabrication, i.e. photolithography followed by electroforming, or negative fabrication, i.e. photolithography followed by etching. Indeed, the substrates used are not large enough and/or an insufficient number of springs are made on a single substrate making production costs unacceptable.

SUMMARY OF THE INVENTION

It is an object of the present invention to overcome all of part of the aforecited drawbacks by proposing a barrel whose spring is more compact at rest and whose torque is less dependent on the degree of winding of the spring.

The invention therefore relates to a barrel including a box for receiving a pivot arbour and at least one spring, wherein said at least one spiral spring is mounted between the internal wall of the box and the external wall of the pivot arbour, and can be wound to supply mechanical energy, characterized in that the barrel further includes a device for increasing the torque of said at least one spring comprising supplementary energy accumulation curves in addition to the spiral shape of said at least one spring, said curves of substantially rectangular cross-section forming alternations with respect to said spiral trajectory over at least one portion of the coils of said at least one spring so that the barrel torque is customized according to the winding tension of said at least one spring.

It is thus clear that the quantity of material of the spring which "works", i.e. which is capable of being deformed to store energy, is very substantially increased which enables the barrel to maintain a substantially equivalent or higher torque compared to barrels including current S-shaped springs.

This also enables the barrel torque to be customized, for example by making it more constant to improve the isochronism of a timepiece. Indeed, since the compactness of a spring according to the invention is more suited to said positive and/or negative fabrication methods, it is possible to mass produce asymmetrical springs which allow the barrel torque to be customized according to the winding tension of said springs.

In accordance with other advantageous features of the invention:
- the supplementary energy accumulation curves form alternations with respect to said spiral trajectory over all or part of the coils of said spring;
- at least one of the curves has a cross-section which is constant or non-constant;
- at least one of the curves has a symmetrical or non-symmetrical trajectory with respect to said spiral trajectory;
- the supplementary energy accumulation curves are integral with said at least one spring;
- said at least one spring and/or the supplementary energy accumulation curves are formed from a silicon base or a metal or metallic alloy base;
- the barrel includes several stacked springs working in parallel.

The invention also relates to a timepiece, characterized in that it includes a barrel according to any of the preceding variants.

BRIEF DESCRIPTION OF THE DRAWINGS

Other features and advantages will appear clearly from the following description, given by way of non-limiting illustration, with reference to the annexed drawings, in which:
FIG. 1 is a view of a current barrel;
FIGS. 2 and 3 are top views of possible distributions of torque increasing devices according to the invention;
FIG. 4 is a partial enlarged diagram of FIG. 2.

DETAILED DESCRIPTION OF PREFERRED EMBODIMENTS

As explained hereinbefore, it is an object of the present invention to propose a barrel wherein the torque provided is less dependent on the degree of winding of the spring, but also wherein the torque is substantially equivalent or increased to maintain or improve the operating autonomy of the timepiece movement in which the barrel is mounted.

According to the invention, in addition to the usual spring, the barrel includes a device for increasing the torque of said spring comprising supplementary elastic energy accumulation curves made on said spring so that the barrel torque is customized according to the winding tension of said at least one spring. Preferably according to the invention, the supplementary energy accumulation curves form alternations with respect to said spiral trajectory over at least one portion of the coils of said spring. In their wound state, the curves tend to follow the trajectory of the spiral, i.e., under stress, they are substantially counterbalanced and are wedged between the box and/or the remainder of the spring and/or the pivot arbour like an ordinary spring.

Non-exhaustive examples of the distribution of torque increasing devices 12, 12', 22' of barrel 11, 21 are shown in FIGS. 2 and 3. FIG. 3 shows that the torque increasing device 22 of barrel 21 includes a single series of supplementary energy accumulation curves 24, formed by a plurality of alternations 26 which are distributed over the entire length L of spring 27 and which extend alternately from each side of the theoretical trajectory of a spiral.

FIG. 2 shows that the torque increasing devices 12, 12' of barrel 11 each include a series of supplementary energy accumulation curves 14, 14' formed by a plurality of alternations which are each distributed over one part of the length L of spring 17. Thus, the distal series of the first device 12 is distributed over an intermediate coil of spring 17 and includes alternations 16 on each alternate side of the theoretical trajectory of a spiral. Moreover, the proximal series 14' of the second device 12' is distributed over the inner coil of spring 17 and includes alternations 16' on each alternate side of the theoretical trajectory of a spiral.

Preferably, the cross-section of alternations 16, 16', 26 is substantially rectangular, i.e. the thickness and height of said alternations are substantially rectilinear and perpendicular to each other. However, this does not prevent the thickness, and incidentally, the cross-section of the curves from being constant or non-constant, as explained hereinafter.

It is thus clear that a barrel according to the invention may include one or several torque increasing devices distributed over one portion or the entire length of the spring so that the quantity of material of the spring which "works", i.e. which is capable of being deformed to store energy, is very substantially increased, which enables the barrel to maintain a substantially constant equivalent torque compared to current S-shaped springs, while being much more compact at rest.

By way of example, a current S-shaped spring at rest, i.e. prior to being mounted in the barrel box which is 1.2 cm in diameter, has a rectangular space requirement of around 6 cm by 15 cm. Advantageously according to the invention, the space requirement of a spring at rest according to the invention is reduced to a diameter of between 1 and 5 cm with a pitch of between 0.1 and 5 mm between the coils.

Of course, in the FIG. 2 view, it is also possible to envisage that a single device over the entire length of the spring also comprises two series of supplementary energy accumulation curves, the first series of which would be distal and the second proximal.

A non-exhaustive variant of alternations 16 is shown in FIG. 4. In this Figure, supplementary energy accumulation curves 14, i.e. alternations 16, are integral with spring 17. It is not, however, essential for the supplementary energy accumulation curves to be integral with the spring. By way of example, they may be fabricated separately, then joined together and finally integrated in the barrel.

In the variant illustrated in FIG. 4, curves 14 are integral with spring 17 and form alternations 16 on each alternate side of the theoretical trajectory T of a spiral. It will be noted in FIGS. 2 and 4 that curves 14, 14' are preferably alternated with parts of spring 17 having no curves to prevent any butting between the two series of curves. Finally, alternations 16 have a thickness $E_2$ which may be equal to or different from thickness $E_1$ of spring 17.

Evidently, it is clear that at least one alternation 16, 16', 26 of supplementary energy accumulation curves 14, 14', 24 may have a constant or non-constant cross-section, namely the cross-section comprised within the plane including the thickness and height of spring 17, 27. At least one alternation 16, 16', 26 of supplementary energy accumulation curves 14, 14', 24 may also have constant or non-constant symmetry with respect to spiral trajectory T. By way of example, a symmetrical symmetry may include sinusoidal and/or sinusoidal curves with respect to spiral trajectory T. Finally, they may be distributed symmetrically or non-symmetrically over all or part of the spring.

In light of the above explanations, the spring and/or the supplementary energy accumulation curves may advantageously be formed by material removal techniques, i.e. of the negative type, such as a deep reactive ion etch of a single crystal silicon wafer, or conversely, by material adding techniques, i.e. of the positive type, such as electroforming combining at least one photolithography step and at least one galvanoplasty step.

Alternatively, the spring and/or the supplementary energy accumulation curves may also be formed by hybrid positive and negative techniques, such as an etched substrate wherein the etches are intended to receive an at least partially amorphous material by hot forming such as a metal or a metal alloy.

Thus, owing to the precision of the positive and/or negative techniques, it is possible to mass produce asymmetrical springs which allow the barrel torque to be customized according to the winding tension of said springs. Thus it is perfectly possible to develop a spring which, by way of example, regardless of its winding tension, allows a substantially constant barrel torque.

However, since this type of technique can limit the thickness of the fabricated part, it is proposed that the barrel includes several stacked springs which work in parallel to obtain, for example, a height H similar to current S-shaped springs.

It is thus clear that the spring and/or the supplementary energy accumulation curves may be formed from silicon, such as, in a non-limiting manner, single crystal silicon, silicon carbide, nitride or oxide which may or in crystallised or non-crystallised form, or an amorphous or non-amorphous metallic material, such as, non-exhaustively, nickel or a nickel and phosphorus based alloy.

Of course, this invention is not limited to the illustrated example but is capable of various variants and alterations that will appear to those skilled in the art. In particular, the shapes of alternations 16, 16', 26 of the supplementary energy accumulation curves shown in FIGS. 2 to 4 may differ to make the torque supplied by the barrel more constant and higher.

Moreover, the invention is intended for a mechanical energy source in general and not specifically for a timepiece barrel.

The invention claimed is:

1. A barrel comprising:
    a box for receiving a pivot arbour and at least one spring, wherein the at least one spring is mounted between an internal wall of the box and an external wall of the pivot arbour, and can be wound to supply mechanical energy;
    a device for increasing torque of the at least one spring including supplementary energy accumulation curves that are integral with the at least one spring and provided in addition to a spiral shape of the at least one spring,
    the curves of substantially rectangular cross-section forming alternations with respect to a spiral trajectory over at least one part of the coils of the at least one spring to customize barrel torque according to a winding tension of the at least one spring.

2. The barrel according to the claim 1, wherein the supplementary energy accumulation curves form alternations with respect to the spiral trajectory over the coils of the at least one spring.

3. The barrel according to claim 1, wherein the cross-section of at least one of the curves is constant.

4. The barrel according to claim 1, wherein the cross-section of at least one of the curves is not constant.

5. The barrel according to claim 1, wherein the at least one spring and/or the supplementary energy accumulation curves are formed from a silicon base.

6. The barrel according to claim 1, wherein the at least one spring and/or the supplementary energy accumulation curves are formed from a metal or metallic alloy base.

7. The barrel according to claim 1, comprising plural stacked springs working in parallel.

8. A timepiece comprising the barrel according to claim 1.

* * * * *